United States Patent [19]
Benker et al.

[11] Patent Number: 5,162,840
[45] Date of Patent: Nov. 10, 1992

[54] APPARATUS FOR REPRODUCING THE IMAGES ON SECTIONS OF EXPOSED AND DEVELOPED PHOTOGRAPHIC FILMS

[75] Inventors: Gerhard Benker, Pullach; Erich Nagel, Anzing; Helmut Neudecker, Munich, all of Fed. Rep. of Germany

[73] Assignee: Agfa-Gevaert Aktiengesellschaft, Leverkusen, Fed. Rep. of Germany

[21] Appl. No.: 759,886

[22] Filed: Sep. 13, 1991

[30] Foreign Application Priority Data

Oct. 1, 1990 [DE] Fed. Rep. of Germany ....... 4031025

[51] Int. Cl.$^5$ ...................... G03B 27/32; G03B 27/52
[52] U.S. Cl. ...................................... 355/32; 355/35; 355/38
[58] Field of Search .................. 355/32, 35, 38, 50

[56] References Cited

U.S. PATENT DOCUMENTS 4,627,719 12/1986 Nitsch ................................... 355/41
4,990,952 2/1991 Watanabe ............................. 355/50

Primary Examiner—Monroe H. Hayes
Attorney, Agent, or Firm—Peter K. Kontler

[57] ABSTRACT

Apparatus for copying the images of selected frames on sections of exposed and developed roll films or of diapositives has a set of advancing rolls or a reciprocable pusher to move a film section or a diapositive from a discrete first portion of a first path into a second portion which terminates at the copying station, and thereupon from a first portion of a second path (such first portion is common to the second portion of the first path) into a discrete portion of the second path. A switching device is located at the junction of the first and second portions of the first path to prevent copied film sections or diapositives from reentering the first portion of the first path on their way away from the copying station. This renders it possible to introduce a fresh film section or a fresh diapositive into the first portion of the first path while a film section or a diapositive is located at the copying station or is on the way toward the discharge end of the second path.

19 Claims, 3 Drawing Sheets

APPARATUS FOR REPRODUCING THE IMAGES ON SECTIONS OF EXPOSED AND DEVELOPED PHOTOGRAPHIC FILMS

CROSS-REFERENCE TO RELATED CASE

Certain features of the apparatus of the present invention are described and shown in commonly owned copending patent application Ser. No. 07/759,890 filed Sep. 13, 1991 for "Apparatus for advancing and guiding webs of photographic material and the like".

BACKGROUND OF THE INVENTION

The invention relates to improvements in apparatus for manipulating short or long series of image-bearing exposed and developed photographic films, such as rows of coherent film frames or framed diapositives.

Commonly owned U.S. Pat. No. 4,627,719 to Nitsch et al. discloses a method of and an apparatus for reproducing the images of film frames. A person in charge introduces the leaders of successive sections of exposed and developed roll films into the inlet of the copying apparatus. The leader of a thus introduced roll film section is engaged by a drive and is transported through a scanning station toward and into a magazine. The apparatus processes the information which is detected and furnished by the scanning unit (such as the position(s) of that(those) film frame(s) which requires or require copying, and the exposure data) before the film is advanced from the magazine in the opposite direction so that successive frames of the advancing film move through a copying station in reverse order, i.e., in a sequence opposite to that of moving such film frames through the scanning station. When the copying operation is completed, the film section is moved out of the apparatus along the same path as during introduction into the apparatus and during transport toward the magazine by way of the scanning station.

Apparatus of the just outlined character are often utilized for the making of prints from customer films which are shipped or otherwise delivered to a photographic processing laboratory, either from dealers or directly from or by customers. For example, a customer may wish to obtain one or more prints of images of one or more frames on a single row of coherent exposed and developed film frames, or of one or more frames forming part of each of two, three or more discrete film sections. Each such section can consist of a certain number (e.g., four, six or eight) coherent film frames. The person in charge of introducing successive roll film sections into the apparatus can perform one or more additional operations, such as introducing into the apparatus information pertaining to the number of prints to be made, visually ascertained color correction values and/or others.

A drawback of the patented apparatus is that the person in charge cannot influence the frequency of introduction of successive roll film sections into the inlet for automatic transport toward and through the scanning station, into the magazine, from the magazine, through the copying station and back toward and outwardly through the inlet. Thus, the operator must await completion of the processing and ejection of a preceding roll film section before the apparatus is ready to accept the next section. This limits the output of such apparatus because the introduction and/or treatment of a next-following film section cannot coincide, even in part, with the treatment of the preceding film section or sections.

The situation is analogous in presently known apparatus for the making of reproductions of images of diapositives. The person in charge inserts a first diapositive which is thereupon advanced to the copying station and back to the inlet where it is to be removed by hand. This renders the inlet accessible for introduction of the next-following diapositive. Thus, the diapositives can be considered and are treated as single-frame sections of exposed and developed roll films. The output of existing apparatus could be increased without unduly burdening the person in charge, i.e., such person could examine and introduce a number of roll film sections or diapositives greatly exceeding the maximum possible output of existing copying machines for discrete frames (diapositives) or for rows of coherent frames of exposed and developed roll films.

OBJECTS OF THE INVENTION

An object of the invention is to provide an apparatus which can process sections of exposed photographic films at a higher frequency than heretofore known apparatus.

Another object of the invention is to provide an apparatus which can accept and manipulate a next-following film section simultaneously with the processing of the preceding film section.

A further object of the invention is to provide an apparatus which enables the person in charge to devote her or his attention to the introduction of successive film sections because such person need not be concerned with the evacuation of processed film sections from the apparatus.

An additional object of the invention is to provide the apparatus with novel and improved means for moving or advancing and guiding successively admitted film sections on their way toward and from the copying station.

Still another object of the invention is to provide an apparatus which is constructed and assembled in such a way that the locus of admission of successive film sections serves exclusively as an inlet for successive film sections.

A further object of the invention is to provide a novel and improved method of reproducing the images of exposed and developed film frames at a frequency greatly exceeding that which can be achieved in accordance with heretofore known methods.

SUMMARY OF THE INVENTION

The invention is embodied in an apparatus for manipulating a series of image-bearing exposed and developed photographic films, particularly film sections with one or more film frames which are returned to a laboratory by customers wishing to obtain reproductions or additional reproductions of images of certain film frames. The apparatus comprises a film copying unit, an image scanning unit, means for advancing successive films of the series of films in a first direction along a first path first through one of the two units and thereafter through the other unit, and means for thereupon moving successive films of the series in a second direction along a second path first through the other unit and thereafter through the one unit.

The first and second paths preferably merge at an acute angle. The arrangement is preferably such that the two paths have common first portions and discrete second portions making an acute angle. Successive films of the series are caused to advance from the second into the first portion of the first path, and successive films of the series are thereupon advanced from the first into the second portion of the second path.

At least a portion of one of the paths is or can be disposed at a level above at least a portion of the other path. It is presently preferred to locate the second portion of the first path at a level above the second portion of the second path.

The apparatus can further comprise means for blocking the second portion of the first path against entry of films which are moved from the first toward the second portion of the second path. Such blocking means can include a mobile switching device between the first and second portions of the first path. A presently preferred switching device includes at least one spring (e.g., a weak leaf spring) which is deformable by films advancing from the second portion into the first portion of the first path but blocks the films from advancing from the first portion of the second path into the second portion of the first path.

Each of the advancing and moving means can comprise at least one pair of film-engaging rolls, and such apparatus preferably further comprises a common prime mover for at least one roll of each such pair of rolls. The prime mover can comprise a reversible motor, and the apparatus then preferably further comprises a freewheel between the prime mover and the at least one roll of one of the advancing and moving means. The freewheel can be installed between the reversible motor and the at least one roll of the at least one pair of rolls of the advancing means.

The apparatus can be designed in such a way that successive films of the series which advance along the first path first advance through the copying unit and thereupon through the scanning unit, and that successive films of the series which move along the second path first advance through the scanning unit and thereupon through the copying unit.

The invention is further embodied in an apparatus for manipulating framed image-bearing diapositives in a machine having at least one of a plurality of stations including an image copying station and an image scanning station. The apparatus comprises means for moving successive diapositives of a series of diapositives to and from at least one of the aforementioned plurality of stations, first guide means defining a first path for movement of successive diapositives to the at least one station in a first direction along a first path, and second guide means defining a second path for movement of successive diapositives of the series from the at least one station in a second direction along a second path.

At least a portion of one of the two paths is or can be located at a level above at least a portion of the other path. For example, the inlet of the first path can be located at a level above the outlet of the second path.

The paths preferably comprise common first portions and discrete second portions which make an acute angle.

The apparatus can further comprise means for diverting successive diapositives of the series from the first path into the second path. The moving means can comprise a reciprocable pusher having a first portion which pushes successive diapositives of the series to the at least one station along the first path, and a second portion which pushes successive diapositives of the series from the at least one station along the second path. The common portions of the two paths are preferably located at the at least one station, and the diverting means is adjacent such common portions of the two paths to divert successive diapositives from the common portions into the discrete second portion of the second path.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
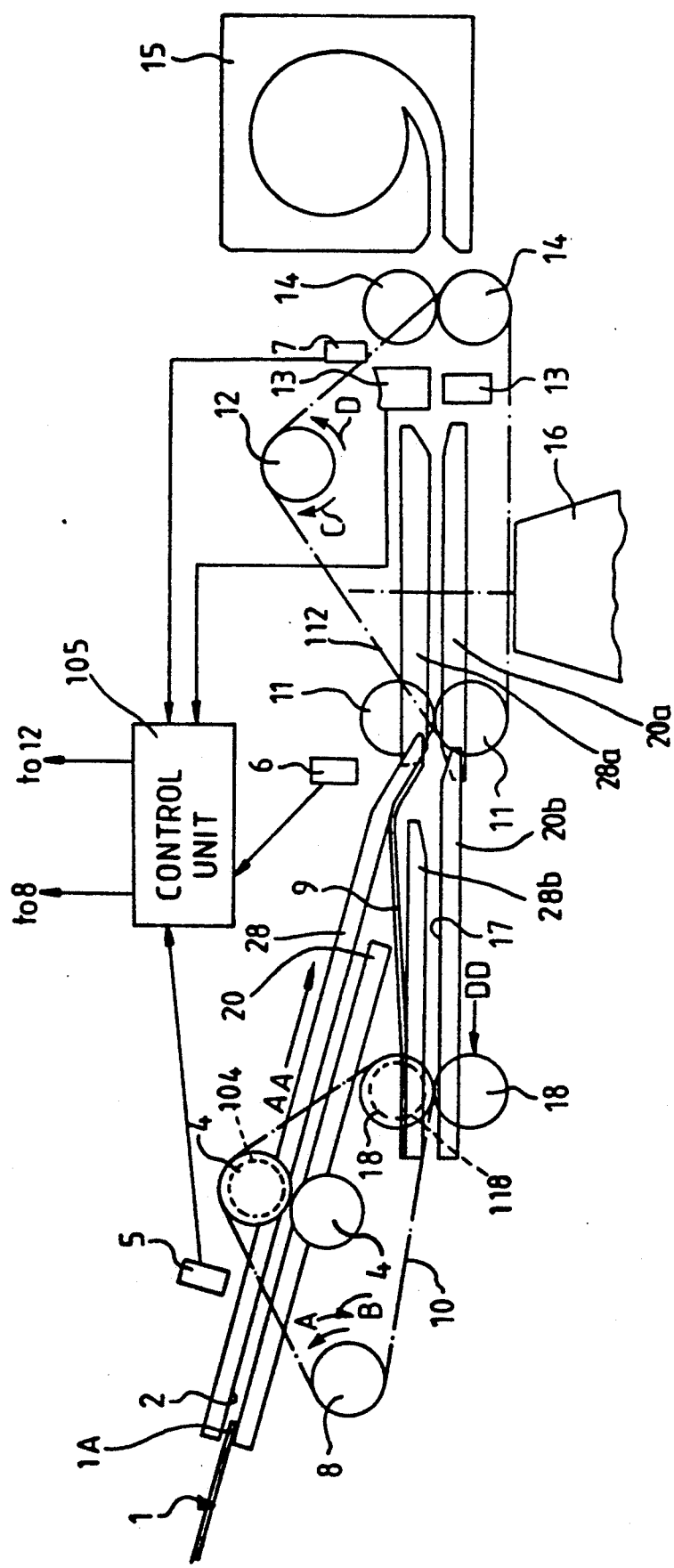
FIG. 1 is a schematic elevational view of an apparatus for the making of reproductions of images of selected frames forming part of multiple-frame sections of exposed and developed photographic roll films.

Referring first to FIG. 1, there is shown an apparatus which is designed for the manipulation of discrete sections 1 of exposed and developed roll films. Each such section consists of a row of a predetermined number of coherent film frames 1a (see FIG. 2), e.g., four, six or eight coherent film frames 1a. Each section 1 is provided with an information bearing tab 21 which projects beyond one (1b) of its marginal portions 1b, 1c.

Figure 2:
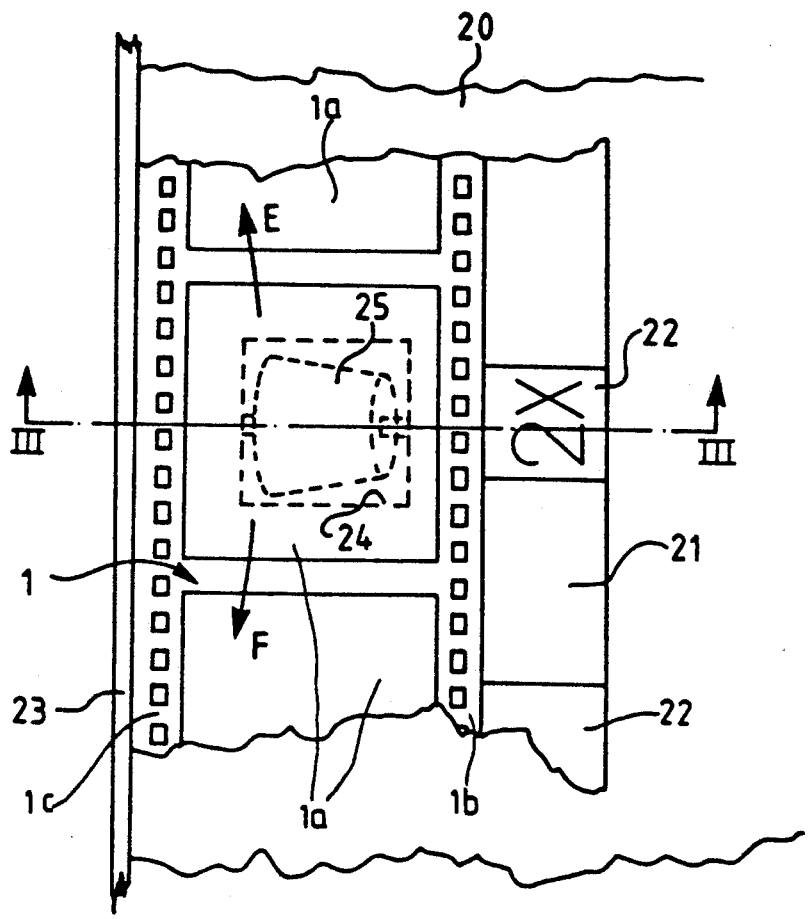
FIG. 2 is an enlarged plan view of a portion of the advancing or moving means for successive roll film sections, one roll of a pair of advancing rolls for roll film sections being indicated by broken lines.
Figure 3:
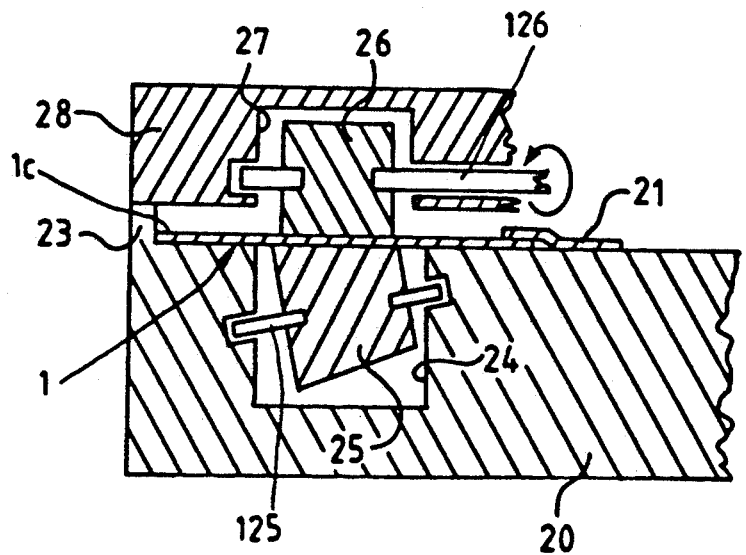
FIG. 3 is a fragmentary transverse sectional view substantially as seen in the direction of arrows from the line III—III in FIG. 2.

The person in charge introduces the leader 1A of a discrete section 1 into the inlet of a channel 2 which is defined by guides 20 and 28 and slopes downwardly toward and beyond the nip of two advancing rolls 4 forming part of an advancing unit. The advancing unit further includes the guides 20, 28, two additional advancing rolls 11, two additional guides 20a, 28a, and two further advancing rolls 14 immediately or closely upstream of the receiving end of a magazine 15 for temporary storage of portions of successive sections 1. The construction, mounting and mode of operation of advancing rolls 4, 11 and 14 are such that they cause the marginal portions 1c of successively introduced film sections 1 to advance along and to abut a stationary guide rail 23 (FIGS. 2 and 3). This ensures that the sections 1 advance in predetermined positions through a copying unit 16 and through a scanning unit 13 which is located between the copying unit 16 and the magazine 15 (as seen in the direction (arrow AA) of advancement of sections 1 along the aforementioned first path).

An optoelectronic or other suitable detector or sensor 5 (e.g., a microswitch) is adjacent the first path and is installed above the channel 2 at least slightly ahead of the advancing rolls 4 to generate a signal in response to detection of the leader 1A of an oncoming section 1. The signal is transmitted to a control unit 105 (e.g., a unit including a microprocessor) of any known design.

A second detector 6 is adjacent the first path for successive film sections 1 immediately or closely ahead of the advancing rolls 11, and a third detector 7 is mounted between the scanning unit 13 and the advancing rolls 14. The outputs of the detectors 6 and 7 are also connected to the control unit 105. If the control unit 105 receives a signal from the detector 5 but not from the detectors 6 and 7, it starts a prime mover 8 (e.g., a reversible electric motor) which can drive the upper advancing roll 4 by way of one or more endless flexible elements 10 (e.g., endless chains or belts) and a freewheel 104 of any known design. The freewheel 104 is installed and operates in such a way that it transmits torque from the motor 8 to the upper advancing roll 4 when the output element of the motor 8 is driven to rotate in the direction of arrow A, i.e., when the endless flexible element 10 (hereinafter called belt) is to rotate the upper advancing roll 4 in a counterclockwise direction. This causes the leader 1A to advance through the nip of the advancing rolls 4 (the film section 1a rotates the lower advancing roll 4) and on toward the nip of the advancing rolls 11.

The third detector or sensor 7 is optional because the scanning unit 13 can be designed to transmit to the control unit 105 a signal in response to detection of the leader 1A of a section 1 between the guides 20a, 28a and the advancing rolls 14.

The apparatus further comprises a blocking device in the form of a relatively weak leaf spring 9 which is installed between the discharge end of the channel 2 and the nip of the advancing rolls 11 and is sufficiently flexible to yield to the leader 1A so that a section 1 which is being advanced by the rolls 4 can deflect the curved right-hand end portion of the spring 9 and advances into the nip of the rolls 11. In fact, the curved right-hand end portion of the spring 9 can be said to constitute an extension of the lower guide 20 and cooperates with the upper guide 28 to steer the leader 1A into the nip of the advancing rolls 11.

A signal from the detector 6 indicates that the leader 1A of a freshly introduced film section 1 is about to enter the nip of the advancing rolls 11. The control unit 105 then transmits a start signal to a reversible prime mover 12 (e.g., an electric motor) which can rotate the lower roll 11 and the lower roll 14 through the medium of an endless flexible element (hereinafter called belt) 112. The rotor of the motor 12 is started in the direction of arrow C so that the lower advancing roll 11 is started in a clockwise direction and cooperates with the upper roll 11 this upper roll is or can constitute an idler roll) to advance the section 1 between the guides 20a, 28a (i.e., above the copying unit 16) and through the scanning unit 13 toward the nip of the advancing rolls 14. The belt 112 drives the lower advancing roll 14 in a clockwise direction so that the section 1 is advanced through the nip of the rolls 14 and into the magazine 15. The trailing end of the section 1 remains in the nip of the rolls 14.

The scanning unit 13 ascertains the transparency values of film frames 1a forming part of the section 1 and transmits appropriate signals to the copying unit 16. The motor 12 comes to a halt when the detector 7 transmits to the control unit 105 a signal denoting detection of the trailing end of the section 1 which has been scanned at 13 and the leader 1A of which is located in the magazine 15.

The arrangement is preferably such that a signal from the detector 7 terminates clockwise rotation (arrow C) of the rotor of the motor 12 and immediately reverses the direction of rotation of the rotor (arrow D in FIG. 1) so that the new leader (previously the trailing end) of the film section 1 extending into the magazine 15 is caused to move in a second direction (arrow DD) counter to the first direction (arrow AA) and along a second elongated path which is defined by the rolls 14, guides 20a, 28a, rolls 11, a channel 17 between elongated guides 20b, 28b, and advancing rolls 18. The motor 12 then drives the lower advancing roll 11 in a counterclockwise direction, and the motor 8 drives the upper advancing roll 18 in a clockwise direction (note the arrow B which indicates the direction of rotation of the rotor of the motor 8 when the motor 8 is to cause a section 1 to advance along the second path, i.e., in the direction of arrow DD).

The copying unit 16 images some or all of the frames 1a of the section 1 in the second path on the basis of information denoting the positions and transparency values of that frame or those frames 1a which are designated by customer on the tab 21.

The first and second paths have common (coinciding) portions between the magazine 15 and the nip of the advancing rolls 11, and discrete portions (note the channels 2 and 17) which make an acute angle (e.g., an angle of not more than 30°). The right-hand end portion of the leaf spring 9 serves as a means for blocking the left-hand portion of the second path (channel 17) from the left-hand portion (channel 2) of the first path so that the leader of a film section 1 in the second path is compelled to advance from the second path portion which is common with the right-hand portion of the first path into the path portion which is defined by the guides 20b, 28b and the nip of the advancing rolls 18. A signal from the detector 6 or from another detector (not shown) denoting detection of the leader of a section 1 in the second path downstream of the advancing rolls 11 causes the control unit 105 to start the motor 8 in a direction (arrow B) to rotate the upper roll 18 in a clockwise direction so that the rolls 18 cooperate by ejecting the section 1 from the channel 17 while the section moves in the direction of arrow DD. At such time, the freewheel 104 prevents transmission of torque from the belt 10 to the upper advancing roll 4. This ensures that the advancing rolls 4 are idle during expulsion of a freshly copied film section 1 from the channel 17, i.e., from the second path.

When the detector 6 detects the trailing end (formerly the leader) 1A of the freshly copied film section 1, it transmits to the control unit 105 a signal which causes the control unit 105 to reverse the direction of rotation of the rotor of the motor 8 (from B to A) with a delay that is necessary to ensure complete expulsion of the film section from the channel 17. Thus, the apparatus is then ready to advance the next-following section 1 of a shorter or longer series of such sections. The number of revolutions of the advancing rolls 18 in a direction to move a section 1 in the direction of arrow DD (subsequent to detection of the trailing end 1A of such section by the detector 6) is selected with a view to ensure complete expulsion of such section from the channel 17 before the direction of rotation of the rotor of the motor 8 is reversed from B to A.

The next-following film section 1 is then manipulated (advanced toward and into the magazine 15 with simultaneous scanning at 13, moved in the direction of arrow DD, copied at 16 and expelled from 17) in the same way as described above.

If the trailing end of a processed section 1 (which is assumed to have been ejected from the channel 17) continues to extend into the nip of the rolls 18, the upper roll 18 is also combined with a freewheel 118 which becomes effective to prevent rotation of the upper roll 18 when the rotor of the motor 8 is rotated in the direction of arrow A. This ensures that a freshly processed section 1 cannot be retracted into the channel 17 to interfere with the movement of the next section 1 in the direction of arrow DD.

The feature that the control unit 105 for the motor 8 receives signals from the detector 5 as well as from the detectors 6 and 7 ensures that a next-following section 1 can advance toward and beyond the leaf spring 9 only when the advancement of the trailing end of the previously treated section 1 into the channel 17 is already completed. Consequently, the person in charge of feeding successive sections 1 into the inlet of the channel 2 can introduce the leader 1A of a next-following section 1 into the inlet of the channel 2 as soon as such inlet become free, i.e., as soon as the trailing end of the preceding section 1 has advanced beyond such inlet on its way in the direction of arrow AA toward and into the magazine 15. The freewheel 104 ensures that the upper roll 4 can remain idle when the rotor of the motor 8 is driven in the direction of arrow B in order to move the preceding section 1 along the second path, i.e., in and out of the channel 17.

The person in charge can operate a keyboard or other signal transmitting means (not shown) to introduce into the apparatus information pertaining to the number of prints to be made of one or more film frames 1a and/or color correction data for the film section 1 having its leader 1A in the inlet of the channel 2 while the preceding film section 1 is in the process of advancing toward and through the scanning unit 13, into the magazine 15 and thence into the second path for movement through the copying unit 16. This entails considerable savings in time in comparison with apparatus wherein the inlet for a next-following film section constitutes the outlet for the preceding section.

FIG. 2 and 3 illustrate a presently preferred mode of advancing successive film sections 1 along the first oath and/or of moving successive film sections along the second path. The roll 26 of FIG. 3 is assumed to correspond to the upper advancing roll 4 of FIG. 1, and the roll 25 of FIGS. 2 and 3 is assumed to correspond to the lower advancing roll 4 of FIG. 1. The rolls 25, 26 of FIGS. 2 and 3 can also constitute the advancing rolls 11, 14 or 18 of FIG. 1.

The film section 1 which is shown in FIGS. 2 and 3 rests on the plate-like lower guide 20 of the means for advancing sections 1 along the first path, i.e., in the direction of arrow AA from the inlet of the channel 2 into the magazine 15. The rail 23 for the marginal portion 1c of the section 1 is shown as an integral part of the guide 20. The tab 21 extends beyond the marginal portion 1b of the film section 1 and overlies the adjacent portion of the guide 20. The tab 21 is provided with fields 22 each of which is adjacent a discrete film frame 1a and each of which can be used by the customer to write down the number of prints to be made of the image borne by the respective frame. FIG. 2 shows that the image of the median frame 1a is to be reproduced twice and that the lower frame 1a of FIG. 2 need not be copied at all. The width of the tab 21 can be selected practically at will because the marginal portion 1b of the section 1 is not used to ensure accurately predictable guidance of the section 1 in the channel 2.

The upper side of the guide 20 has a recess 24 for the advancing roll 25 which is a conical frustum having a larger-diameter end or base adjacent the rail 23 and a smaller-diameter end adjacent the tab 21. The orientation of the shaft 125 of the frustoconical roll 25 is selected in such a way that the topmost portion of the peripheral surface of the roll 25 is flush with the upper side of the guide 20 and is in substantially linear contact with the underside of the film section 1 above it.

The upper advancing roll 26 extends into a recess 27 in the underside of the upper guide 28. This roll is a cylinder having an axis which is parallel to the plane of the film section 1 between the rolls 25, 26, i.e., such axis is parallel to the underside of the guide 28 and to the upper side of the guide 20.

It is preferred to ensure that the rolls 25, 26 bear against the film section 1 between them with an at least substantially constant force. This can be achieved by establishing an elastic coupling between the guides 20 and 28 or by utilizing one or more springs for the shaft 126 of the cylindrical upper roll 26 and/or for the shaft 125 of the frustoconical lower roll 25. The axes of the shafts 125 and 126 are normal to the direction of advancement of the film section 1 along the rail 23.

Due to the aforedescribed shape and mounting of the roll 25, the section 1 of roll film tends to move against and to slide along the rail 23 irrespective of whether the rolls 25, 26 (preferably only the roll 26) are driven to move the section 1 in the general direction of arrow E or F. The inclination of the arrows E and F indicates that the section 1 tends to have a component of movement at right angles to the rail 23 irrespective of the actual direction of its movement, i.e., the marginal portion 1c will contact and move along the adjacent face of the rail 23 irrespective of the direction in which at least one of the rolls 25, 26 is driven.

The roll 26 can be replaced with a second frustoconical roll which is a mirror image of the roll 25 with reference to the plane of the film section 1 in FIG. 3. As a rule, it suffices to employ a single frustoconical or conical roll. Moreover, the utilization of only one conical or frustoconical roll entails certain savings in initial cost because it is simpler to properly mount a cylindrical roll.

Figure 4:
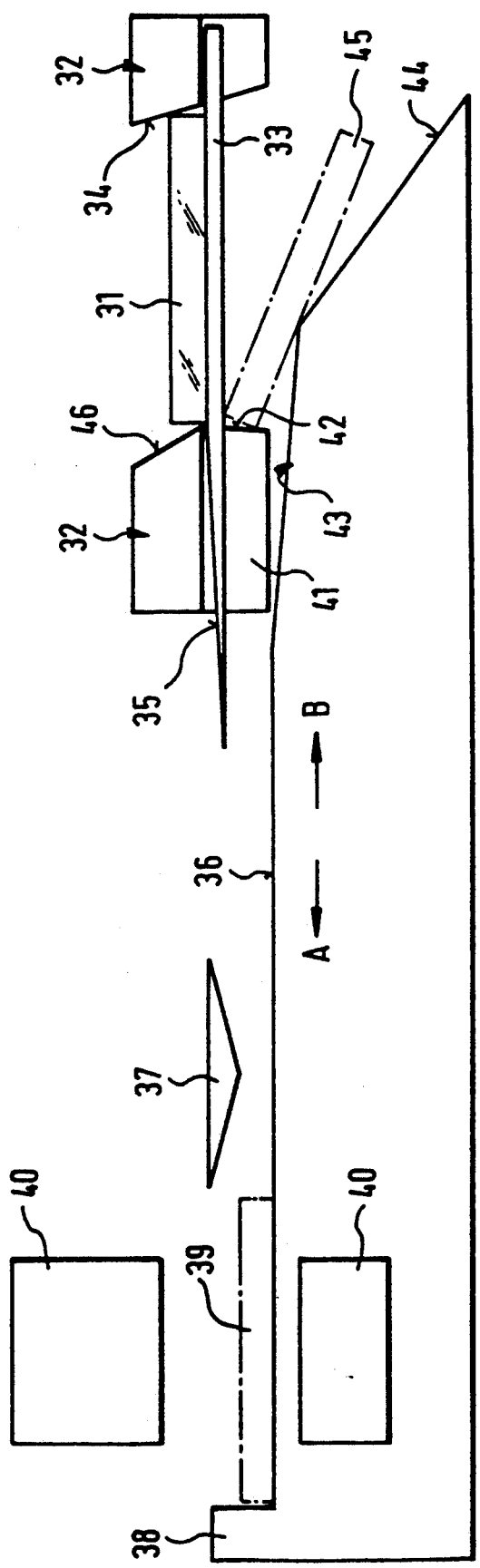
FIG. 4 is a schematic elevational view of an apparatus which is designed to make reproductions of images of discrete diapositives.

FIG. 4 shows certain parts of a presently preferred apparatus for manipulation of diapositives. The means for moving successive diapositives 31 to and from a combined scanning and copying station 40 comprises a pusher 32 which is reciprocable in directions indicated by arrows A and B. The pusher 32 has a window or opening 46 which constitutes the inlet of a first path along which successive diapositives 31 are pushed by a downwardly and rearwardly sloping edge face 34 of the pusher. This ensures that the underside of the diapositive 31 in the window 46 contacts the upper side of a plate-like guide 33 defining a portion of a first path for movement of slides to the station 40 where a properly positioned slide (indicated by phantom lines, as at 39) abuts a stop 38.

As a diapositive 31 in the window 46 moves in the direction of arrow A, it advances along the downwardly sloping portion 35 of the upper side of the guide 33 and toward the upper side of a second guide 36. The diapositive 31 then moves beneath a diverting or switching member 37 on its way toward contact with the guide 36 and into abutment with the stop 38 at the combined scanning and copying station 40. The image of the diapositive 31 (in the position 39) is scanned and reproduced in a manner not forming part of the present invention. The stop 38 can constitute but one of the parts which are provided at the station 40 to properly locate and orient the diapositive preparatory to and during scanning and copying.

The copied diapositive 31 (in the position 39) is then engaged by the downwardly and rearwardly sloping edge face 42 of the pusher 32 while the latter moves in the direction of arrow B to remove the freshly copied diapositive and to provide room for the next diapositive. The edge face 42 is provided on a downwardly extending projection 41 of the pusher 32 which moves the diapositive along the upper side of the guide 36 whereby the diverting member 37 ensures that the diapositive which moves in the direction of arrow B advances beneath the left-hand end portion of the guide 33 and along a downwardly sloping portion 43 of the upper side of the guide 36 on its way into an evacuating duct 44. The guide 36 cooperates with the diverting member 37 to ensure that a freshly copied diapositive 31 moves along a second path having a portion (on the left-hand portion of the guide 36) which is common to a portion of the first oath, and a second portion (at 42) making an acute angle with that portion of the first path which extends along the upper side of the guide 33. The edge face 42 of the projection 41 ensures that a freshly copied diapositive moves along the upper side of the guide 36 all the way from the stop 38 to the evacuating duct 46. A diapositive which is about to leave the apparatus of FIG. 4 by way of the duct 44 is shown by phantom lines at 45.

The person in charge can insert a fresh diapositive 31 into the window 46 while the edge face 42 is in the process of pushing a diapositive along the downwardly sloping portion 43 of the upper side of the guide 36, namely as soon as the window 46 is again located above the guide 33 while the pusher 32 moves in the direction of arrow B. The pusher 32 can be moved by a motor or by hand.

An important advantage of each embodiment of the improved apparatus is that a fresh film section 1 or a fresh diapositive 31 can be inserted into the first path before the preceding film section or diapositive leaves the apparatus. Moreover, freshly copied film sections and/or diapositives need not be removed by hand. All this contributes to a much higher output of the improved apparatus and to more predictable processing of film sections or diapositives. The above advantages are achieved in that the discharge end of the path for expulsion or evacuation of copied film sections or diapositives from the apparatus does not coincide with the inlet for fresh film sections or diapositives. Therefore, a fresh film section or a fresh diapositive can be introduced into the apparatus before the preceding film section or diapositive is expelled or ejected and, consequently, the person in charge has ample time to attend to certain other tasks during the interval which elapses between the introduction of two successive film sections or diapositives. As a rule, or in many instances, such task or tasks will involve introducing certain information pertaining to the film section or diapositive in the inlet of the apparatus.

As shown in FIGS. 1 and 4, the inlet for admission of fresh film sections 1 or diapositives 31 is located at a level above the outlet for freshly copied film sections or diapositives. In other words, the discrete portion of the first path is located at a level above the discrete portion of the second path, and such discrete portions preferably make a relatively small acute angle. This renders it possible to employ a relatively simple but reliable switching or diverting device (9 or 37) which ensures that a film section 1 or a diapositive 31 invariably moves from the discrete portion into the common portion of the first path on its way toward the magazine 15 or toward the stop 38, and that a freshly copied film section 1 or diapositive 31 invariably leaves the common portion of the second path to enter the discrete portion of the second path on its way toward the outlet (discharge end of the channel 17 or the evacuating duct 44).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Apparatus for manipulating a series of image-bearing exposed and developed photographic films, comprising a film copying unit; an image scanning unit; means for advancing successive films of said series in a first direction along a first path first through one and thereafter through the other of said units; and means for thereupon moving successive films of said series in a second direction along a second path first through said other and thereafter through said one unit so that a next-following film of said series can be introduced into said first path while the preceding film of such series is still located in said second path.

2. The apparatus of claim 1, wherein said first and second paths merge at an acute angle.

3. The apparatus of claim 1, wherein said first and second paths have common first portions and second portions making an acute angle.

4. The apparatus of claim 1, wherein at least a portion of one of said paths is disposed at a level above at least a portion of the other of said paths.

5. The apparatus of claim 4, wherein said portion of said one path is a portion of said first path.

6. The apparatus of claim 1, wherein said paths have common first portions and discrete second portions, and further comprising means for blocking the second portion of said first path against entry of films which are being moved from the first into the second portion of said second path.

7. The apparatus of claim 6, wherein said blocking means includes a mobile switching device between the first and second portions of said first path.

8. The apparatus of claim 7, wherein said mobile switching device includes a spring which is deformable by films advancing from the second into the first portion of said first path.

9. The apparatus of claim 1, wherein each of said advancing and moving means comprises at least one pair of film-engaging rolls, and further comprising a common prime mover for at least one roll of each of said pairs.

10. The apparatus of claim 9, wherein said prime mover comprises a reversible motor.

11. The apparatus of claim 10, further comprising a freewheel between said prime mover and the at least one roll of one of said advancing and moving means.

12. The apparatus of claim 11, wherein said freewheel is installed between said reversible motor and at least one roll of the at least one pair of rolls of said advancing means.

13. The apparatus of claim 1, wherein said one unit is said copying unit.

14. Apparatus for manipulating framed image bearing diapositives in a machine having at least one of a plurality of stations including an image copying station and an image scanning station, comprising means for moving successive diapositives of a series of diapositives to and from said at least one station; first guide means defining a first path for movement of successive diapositives to said at least one station in a first direction; and second guide means defining a second path for movement of successive diapositives from said at least one station in a second direction so that a next-following diapositive of said series can be introduced into said first path while the preceding diapositive of such series is still located in said second path.

15. The apparatus of claim 14, wherein at least a portion of one of said paths is located at a level above at least a portion of the other of said paths.

16. The apparatus of claim 14, wherein said paths have common first portions and discrete second portions making an acute angle.

17. The apparatus of claim 14, further comprising means for diverting successive diapositives of said series from said first path into said second path.

18. The apparatus of claim 17, wherein said moving means includes a reciprocable pusher including a first portion which pushes successive diapositives of said series to said at least one station along said first path and a second portion which pushes successive diapositives of said series from said at least one station along said second path.

19. The apparatus of claim 18, wherein said paths have common portions at said at least one station and said diverting means is adjacent said common portions.

* * * * *